United States Patent [19]

Kohzai et al.

[11] 4,331,910
[45] May 25, 1982

[54] POSITIONING CONTROL SYSTEM

[75] Inventors: Yoshinori Kohzai; Hidetsugu Komiya, both of Hino; Yoichi Amemiya, Hachioji; Yo Ikebe; Jun Ikebe, both of Tokyo, all of Japan

[73] Assignee: Fujitsu Fanuc Limited, Tokyo, Japan

[21] Appl. No.: 118,227

[22] Filed: Feb. 4, 1980

[51] Int. Cl.$^3$ .............................................. G05B 5/01
[52] U.S. Cl. .................................. 318/618; 318/327
[58] Field of Search ............... 318/561, 618, 327, 616, 318/617

[56] References Cited

U.S. PATENT DOCUMENTS

| | | | |
|---|---|---|---|
| 3,855,513 | 12/1974 | Brunner | 318/618 X |
| 3,896,361 | 7/1975 | Inaba | 318/618 X |
| 4,219,765 | 8/1980 | Morsing | 318/561 |
| 4,242,622 | 12/1980 | Shepard | 318/618 |
| 4,250,438 | 2/1981 | Onoda | 318/561 |

Primary Examiner—B. Dobeck
Attorney, Agent, or Firm—Staas & Halsey

[57] ABSTRACT

A positioning control system which has a servo system provided with a position feedback system for detected positional information and a velocity feedback system for detected velocity information of a motor and in which the motor is driven by the servo system in accordance with commanded positional information to position a movable machine part of a numerical-controlled machine. The disparity between the detected velocity of the movable machine part and the detected motor velocity is fed back to the control input side of the motor, thereby suppressing vibration of the movable machine part at the moment of completion of the positioning operation.

9 Claims, 5 Drawing Figures

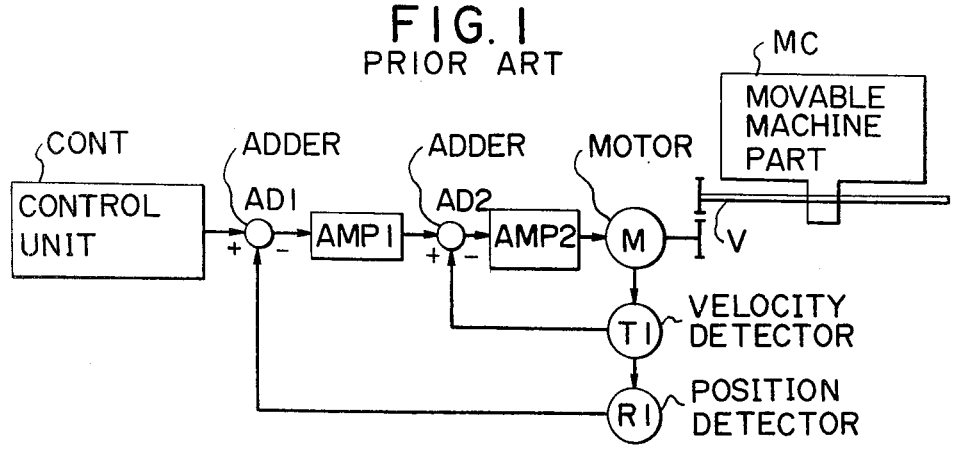
FIG. I
PRIOR ART
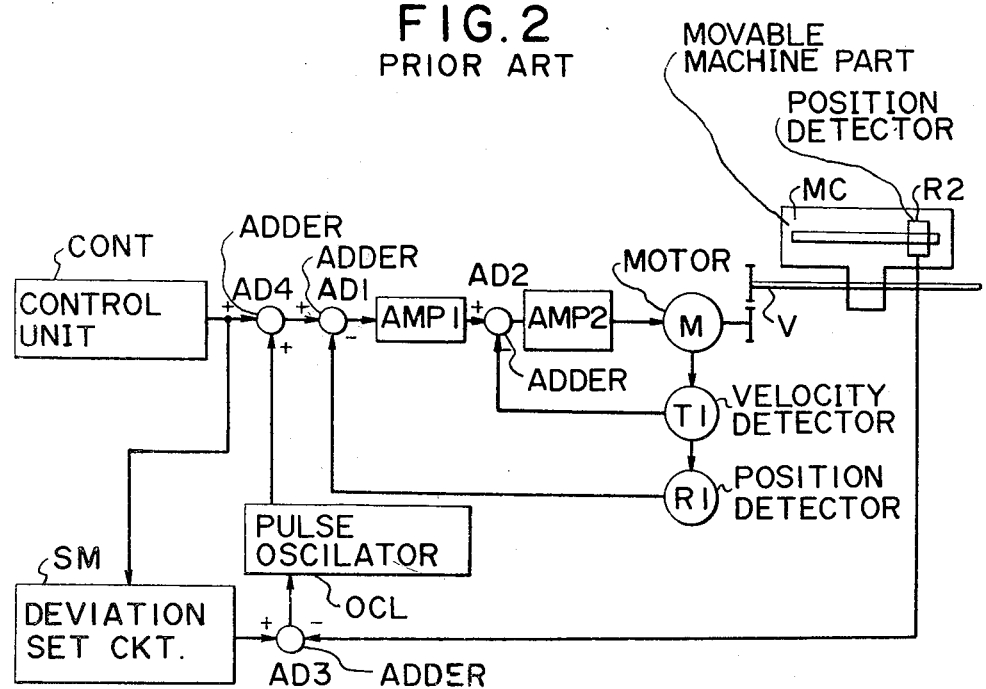
FIG. 2
PRIOR ART

POSITIONING CONTROL SYSTEM

BACKGROUND OF THE INVENTION

1. Field of the Invention

This invention relates to a positioning control system for accurate positioning of numerical-controlled machines.

2. Description of the Prior Art

A positioning control system heretofore employed for numercial-controlled machines (for example, as shown in FIG. 1) which employs a closed loop type servomechanism. With this conventional system, as shown in FIG. 1 velocity information detected by a tachogenerator or a like velocity detector T1, and positional information detected by a resolver or a like position detector R1, both detectors being mounted on a motor M, are fed back to the input side, wherein they are applied to adders AD1 and AD2, respectively. In the adder AD1, a comparison is made between commanded positional information from a control unit CONT and the detected positional information from the position detector R1, and the resulting difference signal is provided as a velocity command to the adder AD2 via an amplifier AMP1. In the adder AD2, the velocity command and the detected velocity information from the velocity detector T1 are compared, and the motor M is driven via a velocity amplifier AMP2 in such a manner as to reduce the difference between these quantities to zero, by which a feed screw V is driven to position a movable machine part MC.

In the conventional system described above, in which the velocity feedback is derived from the motor M, it is impossible to correct vibration of the mechanical system which is produced by its various elements at the end of the positioning operation; therefore, accurate positioning may in some cases be impossible. With the use of an arrangement in which the velocity feedback is derived directly from the mechanical system, the vibration can be suppressed. In general, however, when the mechanical system is included in the velocity feedback loop, various characteristics of the mechanical system exert an adverse influence on the velocity control loop; namely, even in a steady state in which no velocity difference exists between the motor M and the movable machine part MC, that is, when no vibration occurs, the characteristics of the mechanical system are fed back to make the velocity control loop unstable.

In the past, an attempt has been made to prevent vibration of the mechanical system by employment of a positioning control system such as depicted in FIG. 2. This system includes another feedback loop, for the positional information of the mechanical system, in the arrangement of FIG. 1. With this system, the position of the machine is detected by a position detector R2 mounted on the movable machine part MC, the commanded positional information is applied to a deviation set circuit SM to detect the expected rotational angle of the output shaft of the motor M, and then the two items of information are compared by adder AD3 to thereby detect an error of the whole mechanical system. The error signal thus detected is applied to a pulse oscillator OCL to yield correction pulses corresponding to the error. The correction pulses are provided to an adder AD4, wherein they are added to the commanded positional information from the control unit CONT, thereby correcting the commanded rotational angle of the motor M to eliminate the error. Since the error signal derived from the adder AD3 also includes an error resulting from vibration of the mechanical system, it is possible theoretically to suppress the vibration of the mechanical system; nevertheless, this system is intended, in general, to correct position errors, such as backlash error, pitch error and so forth. The gain of this system having the position detector R2 is limited by the natural frequency of the mechanical system, so that in the case of the natural frequency being low, the gain for a very small displacement is reduced; thus the response to a very small displacement (such as mechanical vibration or the like) is essentially retarded, resulting in a failure to sufficiently suppress the vibration. Moreover, the use of the deviation set circuit is disadvantageous economically.

SUMMARY OF THE INVENTION

It is an object of this invention to provide a positioning control system for numerical-controlled machines which prevents vibration of a mechanical system, to provide for enhanced accuracy in positioning.

Another object of this invention is to provide a positioning control system for numerical-controlled machines in which vibration of a mechanical system at the moment of completion of the positioning operation is detected and a motor is controlled in a manner to suppress the vibration, thereby to provide enhanced accuracy in positioning. Briefly stated, the present invention comprises a servo system for feeding back detected positional information from a position detector and detected velocity information from a velocity detector for detecting the velocity of a motor, and means for detecting the velocity of a movable machine part. The difference between the velocity information of the movable machine part detected by the detecting means and the velocity information of the motor is fed back to control the motor.

BRIEF DESCRIPTION OF THE DRAWINGS

FIGS. 1 and 2 are block diagrams showing conventional positioning systems; and

DESCRIPTION OF THE PREFERRED EMBODIMENTS

Figure 3:
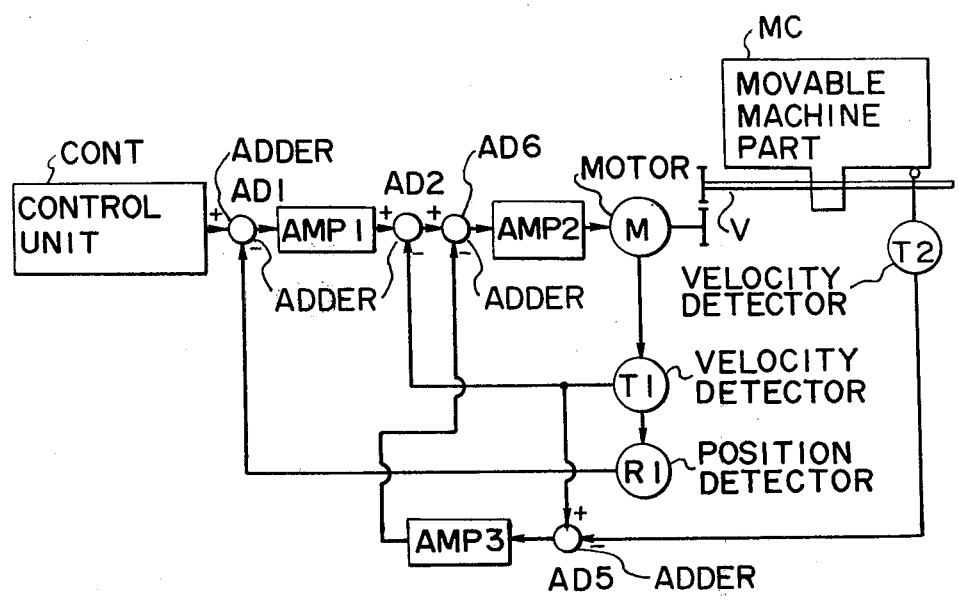
FIGS. 3, 4 and 5 are block diagrams respectively illustrating embodiments of this invention.

In FIG. 3, there is illustrated in block form an embodiment of this invention as applied to an ordinary positioning control system of the type where the position and the velocity feedback are obtained from the motor M. Reference character T2 indicates a velocity detector; AD5 and AD6 designate adders; and AMP3 identifies an amplifier. The parts corresponding to those in FIG. 1 are marked with the same reference characters.

Commanded positional information from the control unit CONT is compared by the adder AD1 with detected positional information from the position detector R1, and the resulting amplified difference signal (interpreted, as a velocity command) and the detected velocity information from the velocity detector T1 are compared, by adder AD2. If is simply driven via the velocity amplifier AMP2 so that the difference detected by AD2 is reduced to zero, such an operation would be carried out in exactly the same manner as in the prior art.

The velocity detector T2 is composed of, for example, a combination of a tachogenerator and a rack and pinion, a combination of an Inductosyn or a like linear position detector and a frequency-voltage converter, or the like, and is mounted directly on the side of a numerical-controlled machine. The velocity detector T2 detects the velocity of the movable machine part MC, and the detected velocity information is applied to the adder AD5, where it is subtracted from the detected velocity information from velocity detector T1. The difference signal is amplified by the amplifier AMP3 and provided to the adder AD6 for subtraction from the output signal from the adder AD2. The velocity amplifier AMP2 drives the motor M to position the movable machine part MC.

At the moment of completion of the positioning operation, the detected positional information from the position detector R1 and the commanded positional information from the control unit CONT become equal to each other and the output signal from the adder AD1 is reduced to zero, thus tending to stop the motor M from rotating. Accordingly, the detected velocity information from the velocity detector T1 coupled with the motor M should become zero. At this time, if a vibration occurs in the movable machine part MC, then detected velocity information corresponding to the vibration is outputted from the velocity detector T2, and in the adder AD5, the detected velocity information from the velocity detectors T1 and T2 are compared, and the resulting difference signal is provided to the adder AD6. Consequently, by the output from the velocity AD5, the motor M is driven, and in this case, the motor M is controlled so that the difference signal from the adder AD5 is reduced to zero, thus suppressing the vibration of the movable machine part MC. By suppressing the vibration of the mechanical system in this way, the positioning operation is rapidly completed, ensuring accurate positioning. This embodiment involves addition of the velocity detector T2, the amplifier AMP3 and the adders AD5 and AD6, and hence is not complicated in construction.

As will be appreciated from the arrangement shown in FIG. 3, in the present system, only when there is a difference in velocity between the movable machine part MC and the motor M is the difference fed back to produce the effect of suppressing the velocity difference. At a steady velocity, when no velocity difference is present between the movable machine part MC and the motor M, only ordinary velocity feedback is (through adder AD2) is effective so that there is no possibility of various characteristics of the mechanical system exerting adverse influence on the control loop. Moreover, in the case where the natural frequency of the machine is low, the response of the velocity feedback loop can be raised above the limits defined by the natural frequency of the machine; therefore, the gain of the position feedback loop can be selected to be large, and the response to a very small displacement is improved.

Figure 4:
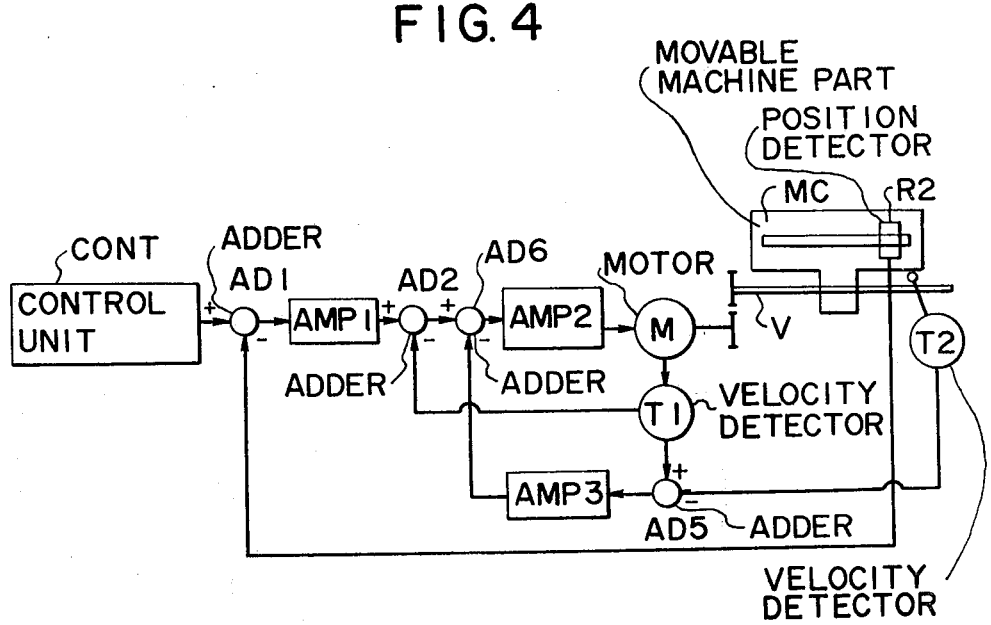

FIG. 4 illustrates in block form another embodiment of this invention as applied to a positioning control system in which ordinary position feedback is derived from the position detector R2, such as an Inductosyn or the like, disposed directly on the side of the machine. In FIG. 4, parts corresponding to those in FIG. 3 are identified by the same reference characters. As will be obvious from FIG. 4, the embodiment of FIG. 4 is nearly identical in construction and in operation with the embodiment of FIG. 3, except that the position detector R2 is mounted on the movable machine part MC; therefore, detailed description need not be repeated. In view of the fact that positioning accuracy is generally enhanced by detecting the positional information from the machine side, the present embodiment may be higher in the positioning accuracy than the system of FIG. 3.

Figure 5:
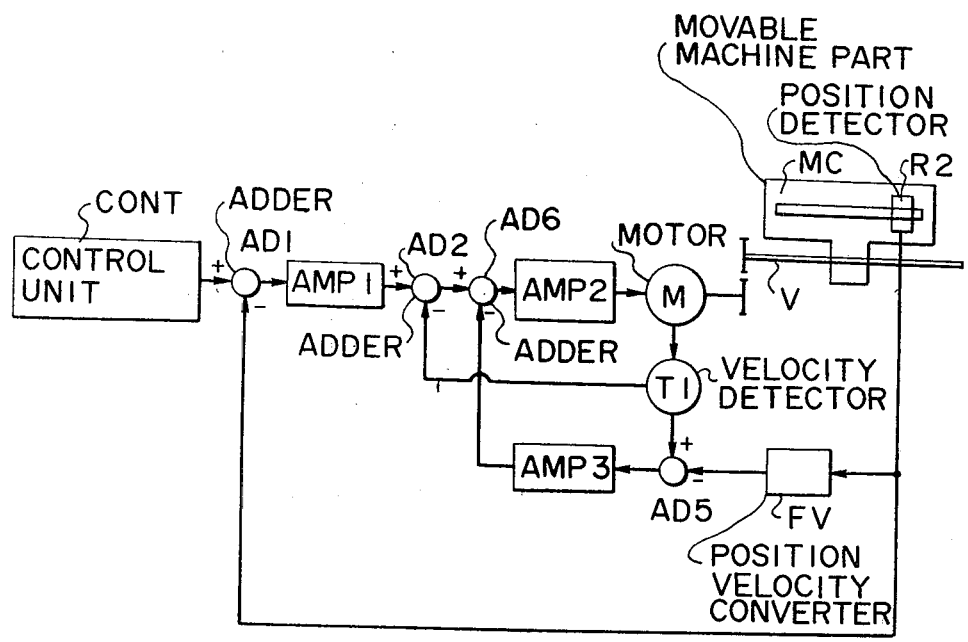

FIG. 5 illustrates in block form a further embodiment of this invention, in which the velocity detector T2 used in FIG. 4 is left out, and the positional information from the position detector R2 mounted on the machine side is processed to obtain the velocity of the movable machine part MC.

A position-velocity converter FV receives the detected positional information from the position detector R2 and calculates and outputs the moving velocity of the movable machine part MC at that time. The position-velocity converter FV is composed of a shaping circuit for wave form shaping a detected pulse signal from the position detector R2 into a constant-pulse-width signal, and a low-pass filter for receiving the output signal from the shaping circuit. The velocity information derived from the position-velocity converter FV is applied to the adder AD5, and then the same operations as those in the embodiments of FIGS. 3 and 4 are performed, by which vibration of the mechanical system is suppressed to ensure accurate positioning. Since the position detector R2 is used for detecting both the position and the velocity information, the arrangement of the machine side can be simplified.

As has been described in the foregoing, according to the present invention, the difference between the velocity of the movable machine part and the motor velocity is fed back to the servo system in the positioning control system for a numerical-controlled machine, in addition to direct velocity feedback from the motor and position feedback from the motor or the machine side, and vibration of the mechanical system, which may be produced by various elements of the mechanical system, is minimized; thus, accurate positioning can be performed. Further, in the case of the steady machine velocity, when no velocity difference exists between the movable machine part and the motor, only the ordinary velocity feedback from the motor is effective, avoiding the likelihood of the control loop being adversely affected by the various characteristics of the mechanical system. Accordingly, by applying the system of this invention to the positioning of a numerical-controlled machine, accurate positioning can be achieved with an economical construction.

It will be apparent that many modifications and variations may be effected without departing from the scope of the novel concepts of this invention.

What is claimed is:

1. A control system for positioning a movable machine part that is connected to a motor in a numerically controlled machine, by feedback within said system of selected positional information of said motor or said machine part, and of information of the velocity of the motor, said control system receiving commanded positional information to operate said system to drive said motor to control the machine part, said control system comprising means for detecting said velocity information of said motor, means for providing said selected positional information, means for providing information corresponding to the velocity of the machine part, and first difference means for outputting the difference between said velocity information of the machine part and said detected motor velocity information for said feedback.

2. The system of claim 1 comprising said means for detecting said velocity information of said motor comprising a velocity detector coupled with the motor, and said means for providing said information corresponding to said velocity information of the machine part comprising a velocity detector coupled to said machine part.

3. The system of claim 1, wherein said selected positional information is of the position of said machine part, said system comprising said means for providing said information corresponding to said machine part velocity comprising means for detecting the positional information of said machine part and for converting said detected positional information of said machine part into said velocity information of said machine part, and said means for detecting said positional information of said machine part comprising a position detector coupled with the machine part.

4. The system of claim 2, comprising a position detector connected to said velocity detector of said motor for providing the positional information of the motor as said selected positional information.

5. The system of claim 4 comprising second difference means for outputting the difference between said commanded position information and said positional information of said motor, third difference means for outputting the difference between a signal corresponding to the output of the second difference means and said velocity information of said motor, fourth difference means for outputting the difference between the output of the third difference means and a signal corresponding to the output of said first difference means, and means for driving said motor with the output of said fourth difference means.

6. The system of claim 2, said predetermined positional information representing the position of the machine part, said system comprising a position detector coupled to said machine part to provide said machine part positional information.

7. The system of claim 6 comprising second difference means for outputting the difference between said commanded position information and said positional information of the machine part, third difference means for outputting the difference between a signal corresponding to the output of said second difference means and the velocity information of said motor, fourth difference means for outputting the difference of the output of said third difference means and a signal corresponding to the output of said first difference means, and means for driving the motor with the output of the fourth difference means.

8. The system of claim 3 comprising second difference means for outputting the difference between the commanded positional information and the position information of the machine part, third difference means for outputting the difference between a signal corresponding to the output of the second difference means and the velocity information of the motor, fourth difference means for outputting the difference between the output of the third difference means and a signal corresponding to the output of said first difference means, and means for driving the motor with the output of the fourth difference means.

9. The system of claim 5, 7, or 8 comprising a first amplifier (AMP 1) connected between said second and third difference means, and a second amplifier (AMP 3) connected between said first and fourth difference means.

* * * * *

UNITED STATES PATENT AND TRADEMARK OFFICE
CERTIFICATE OF CORRECTION

PATENT NO. : 4,331,910

DATED : 25 May 82

INVENTOR(S) : YOSHINORI KOHZAI et al

It is certified that error appears in the above-identified patent and that said Letters Patent is hereby corrected as shown below:

| | |
|---|---|
| Title page | [56] References Cited, "Inaba" should be --Inaba et al.--; "Shepard" should be --Shepard, Jr.--. |
| Col. 1, | line 11, "numercial-controlled" should be --numerical-controlled--; line 12, delete "which"; line 13, delete ", as"; line 14, delete "shown in Fig. 1". |
| Col. 2, | line 62, after "preted" delete ","; line 64, after "pared" delete ","; delete "is". |
| Col. 3, | line 49, delete "is". |

Signed and Sealed this

Ninth Day of November 1982

[SEAL]

Attest:

GERALD J. MOSSINGHOFF

*Attesting Officer*   *Commissioner of Patents and Trademarks*